US006985577B2

(12) United States Patent
Eltschka et al.

(10) Patent No.: US 6,985,577 B2
(45) Date of Patent: Jan. 10, 2006

(54) DEVICE FOR OPTIMIZING THE CIRCUIT SWITCHING CAPACITY OF A SWITCHING CENTER

(75) Inventors: Herwig Eltschka, Starnberg (DE); Norbert Löbig, Darmstadt (DE)

(73) Assignee: Siemens Aktiengesellschaft, Munich (DE)

( * ) Notice: Subject to any disclaimer, the term of this patent is extended or adjusted under 35 U.S.C. 154(b) by 479 days.

(21) Appl. No.: 10/221,355

(22) PCT Filed: Jul. 9, 2001

(86) PCT No.: PCT/DE01/02553

§ 371 (c)(1), (2), (4) Date: Dec. 30, 2002

(87) PCT Pub. No.: WO02/11463

PCT Pub. Date: Feb. 7, 2002

(65) Prior Publication Data

US 2004/0058708 A1 Mar. 25, 2004

(30) Foreign Application Priority Data

Jul. 28, 2000 (DE) ........................................ 100 36 899

(51) Int. Cl.
*G06F 12/10* (2006.01)
*H04L 12/50* (2006.01)
*H04M 3/00* (2006.01)
*H04Q 3/00* (2006.01)
*H04Q 11/00* (2006.01)

(52) U.S. Cl. .................. 379/269; 340/825.52; 370/386; 379/271; 711/203

(58) Field of Classification Search ................. 340/825, 340/825.52; 370/357, 386; 379/242, 269, 379/270, 271, 333, 334; 711/202, 203, 206, 711/209

See application file for complete search history.

(56) References Cited

U.S. PATENT DOCUMENTS

| | | | | | |
|---|---|---|---|---|---|
| 4,816,826 | A | * | 3/1989 | Munter et al. | 340/825.52 |
| 4,873,521 | A | | 10/1989 | Dietrich et al. | 340/825.52 |
| 5,521,924 | A | * | 5/1996 | Kakuma et al. | 370/466 |
| 5,630,088 | A | * | 5/1997 | Gupta et al. | 711/207 |
| 5,784,377 | A | * | 7/1998 | Baydar et al. | 370/463 |
| 6,333,940 | B1 | * | 12/2001 | Baydar et al. | 370/506 |
| 6,728,770 | B1 | * | 4/2004 | Bradford et al. | 709/226 |
| 2002/0166038 | A1 | * | 11/2002 | MacLeod | 711/202 |
| 2003/0114166 | A1 | * | 6/2003 | Franz et al. | 455/453 |
| 2003/0198194 | A1 | * | 10/2003 | Franz et al. | 370/260 |
| 2004/0037298 | A1 | * | 2/2004 | Eltschka et al. | 370/401 |

FOREIGN PATENT DOCUMENTS

| | | |
|---|---|---|
| EP | 0 282 197 | 9/1988 |
| EP | 1 104 205 | 5/2001 |

* cited by examiner

*Primary Examiner*—Harry S. Hong
(74) *Attorney, Agent, or Firm*—Morrison & Foerster LLP

(57) ABSTRACT

The invention relates to a device for circuit switching connections, which are led outside a switching center, with a plurality of peripheral devices that can be addressed under a common HW address by the message distribution system of the switching center. According to the invention, each of the peripheral devices comprises its own logical address, and a splitting up of the peripheral devices into real peripheral devices, which represent the previously mentioned HW address, and into virtual peripheral devices is given. The invention is characterized in that the logical addresses of the peripheral devices, which are used exclusively for controlling connections led outside of the switching center, are located in areas of the switching network that are not expanded into hardware, whereby a virtual switching network unit is defined, and a splitting up of the switching network into real and virtual switching network units is carried out.

8 Claims, 5 Drawing Sheets

DEVICE FOR OPTIMIZING THE CIRCUIT SWITCHING CAPACITY OF A SWITCHING CENTER

CLAIM FOR PRIORITY

This application claims priority to International Application No. PCT/DE01/02553 which was published in the German language on Feb. 7, 2002.

TECHNICAL FIELD OF THE INVENTION

The invention relates to a device for switching through connections carried outside a switching center.

BACKGROUND OF THE INVENTION

In the prior art, a switching node has peripheral devices (connection devices for subscribers or lines), a central computer platform, a message distribution device, and other central units (coupling field, protocol termination devices (e.g., #7), background memory, operating devices). The relationships in this regard are shown in FIG. 1.

The peripheral devices fulfill essential switching technology tasks tied in with the voice channels of the peripheral device. They therefore contain switching technology programs, operating technology programs, and administrative programs, as well as data related to the device, such as connection locations, signaling, authorizations, telephone numbers, individual characteristics of connection lines and subscriber connections, as well as the extension state and configuration of the peripheral device.

The central computer platform coordinates control when establishing and ending a connection, as well as for reactions to administrative and error-related configuration changes.

The peripheral devices are connected with one another and with a common computer platform by a message distribution system. The other central system components make special functions available for the switching system, e.g., for switching voice channels through, for processing signaling protocols, for implementing the operator interface, or for memory for mass data.

For reasons of fail-safe reliability, the central components of a switching system are designed to be redundant (e.g., doubled). The peripheral devices are generally not structured to be redundant. In the case of stricter failure requirements (e.g., rescuing stable connections beyond the failure of a peripheral device), however, peripheral devices can also be redundant.

Remote switching devices of a switching center (Remote Switching Unit, RSU), which include peripheral devices, just like the related switching center (parent switching center), have a local coupling field, and support local switching traffic, can be set up remotely from the parent switching center. In this connection, the transmission segment between the remote switching center RSU and the parent switching center V generally has a smaller bandwidth than the connection bandwidth of the total of the peripheral devices contained in the remote unit, because of the internal traffic in the remote unit. Therefore, for reasons of simplicity, the full bandwidth corresponding to the number of peripheral devices of the remote unit RSU is made available again at the coupling network of the parent switching center. The relationships in this regard are shown in FIG. 3.

If signaling and voice are carried in a disassociated manner, by separate paths, and if the peripheral devices only have the task of protocol processing and/or conversion, without physical termination of the voice channels, the restrictions of the peripheral devices with regard to resource pool and number of voice channels that can be terminated are eliminated. In this case of use, the peripheral device is determined, with regard to its capacity, by the performance capacity of the processors, as well as by the size of the memory and the capacity of the message interface.

Since more than one direction has to be made available for switching voice through between the A subscriber and any B subscriber, two different peripheral devices PE are generally involved in establishing and ending the connection (FIG. 2).

In this case, the restriction concerning the physically determined maximum number of connection lines that can be terminated is eliminated. This makes it possible for a peripheral device to process more than 120 connections at the same time, for example. The relationships in this regard are described in European patent application EP 99123208.3. According to this application, such a peripheral device can be capable of running multiple times on a real peripheral device, resulting in functionality of the connection control of n times 120 (n×120) connections on a real peripheral device, for example.

Without further optimizing measures, however, it is necessary to fully extend the related main coupling network of the switching center. This is also particularly true for all of the virtual peripheral devices that can run on a real peripheral device, although these do not require any voice switch-through capacity in the case of use described above.

If peripheral devices of remote units RSU are used for connection control of connections carried from outside the switching center, and if virtual peripheral devices of the remote units RSU are included for this, the coupling interfaces provided for these virtual peripheral devices on the coupling network also remain unused. This results in a greater space requirement of the switching center (footprint) as well as increased hardware costs and operating costs of the switching center.

SUMMARY OF THE INVENTION

According to an aspect of the invention a method in which the central part of a switching center can be optimized with regard to its space requirement, without the other devices of the switching system being subject to restrictions, is provided.

According to another aspect of the invention, the coupling network is split up into real and virtual portions. The connected virtual peripheral devices are then preferably linked up with the virtual portions of the coupling network. This is connected with the advantage that modules and frames of the coupling network and the message distribution system of the switching center are eliminated. It is fundamentally also possible to link the peripheral devices up with the real portions of the coupling network.

In the following, the invention will be explained in greater detail, on the basis of an exemplary embodiment shown in the figures.

DETAILED DESCRIPTION OF THE INVENTION

Figure 1:
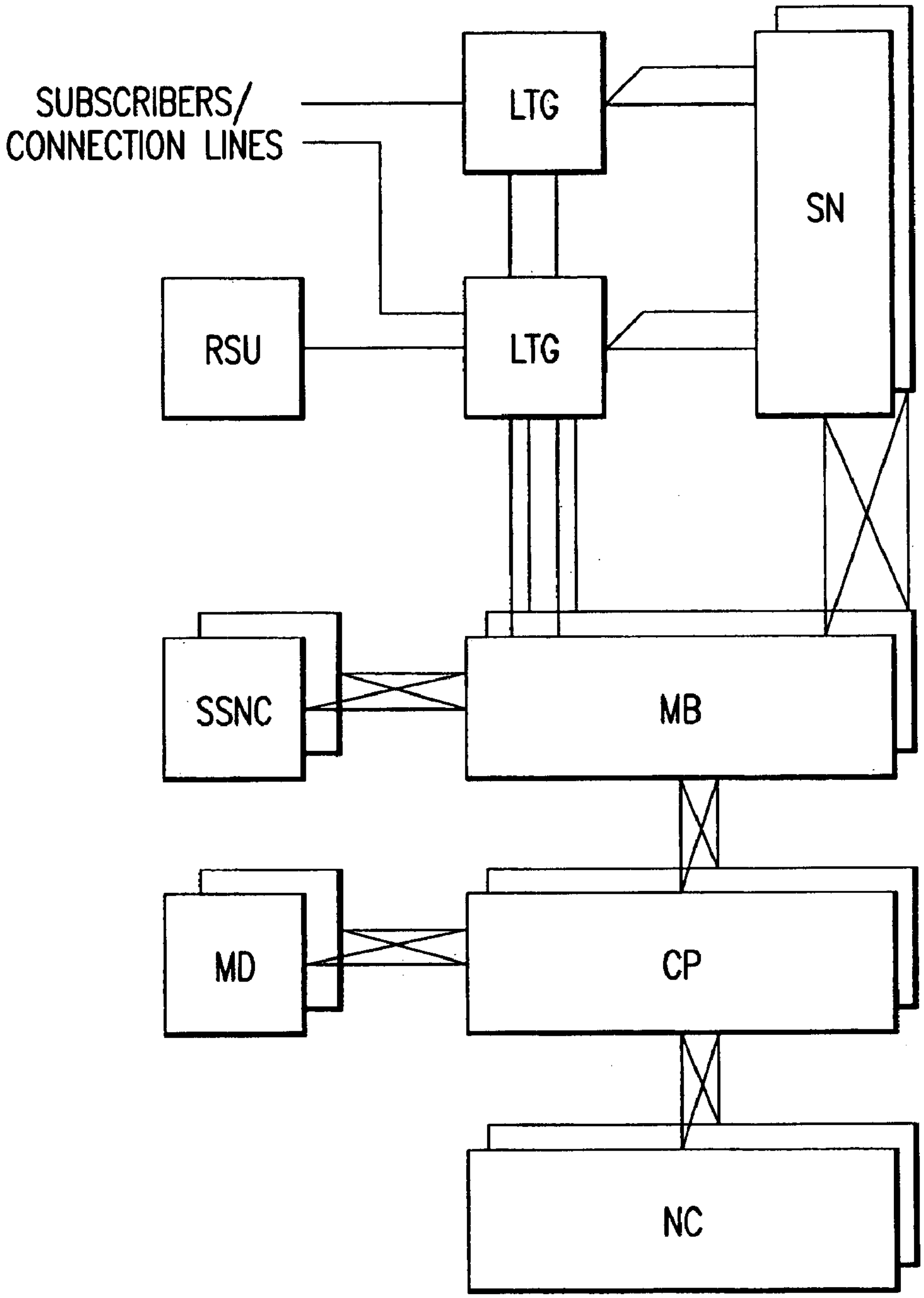
FIG. 1 illustrates the typical architecture of a switching system with undoubted peripheral connection units.

FIG. 1 shows the typical structure of a switching system. According to this figure, peripheral devices LTG, HTI, a central computer platform CP, a message distribution device MB, and other central units (coupling field SN, protocol termination devices SSNC (e.g., #7), background memory MD, operating devices NC) are disclosed.

Figure 2:
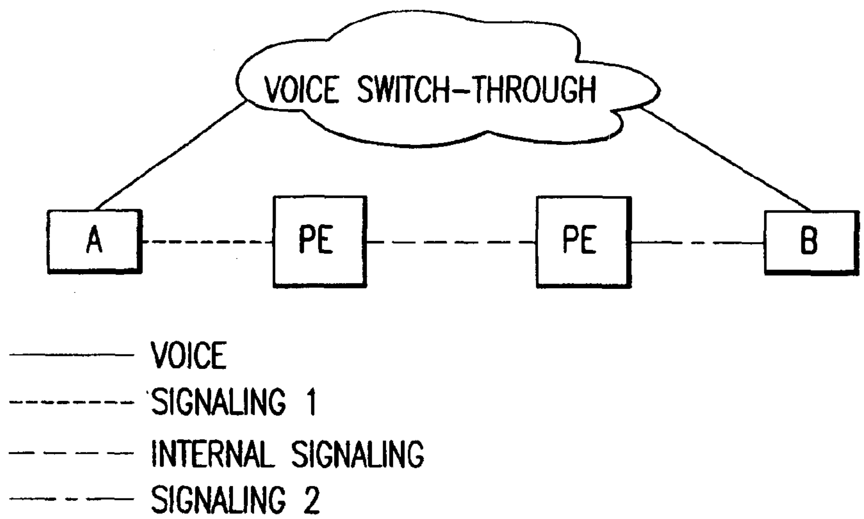
FIG. 2 illustrates separate paths of voice and signaling between two subscribers A and B.

FIG. 2 shows the paths for voice and signaling data between two subscribers A, B. In this connection, voice and signaling data are carried by different paths. Two peripheral devices PE of a switching center are inserted into the path provided for the signaling data.

Figure 3:
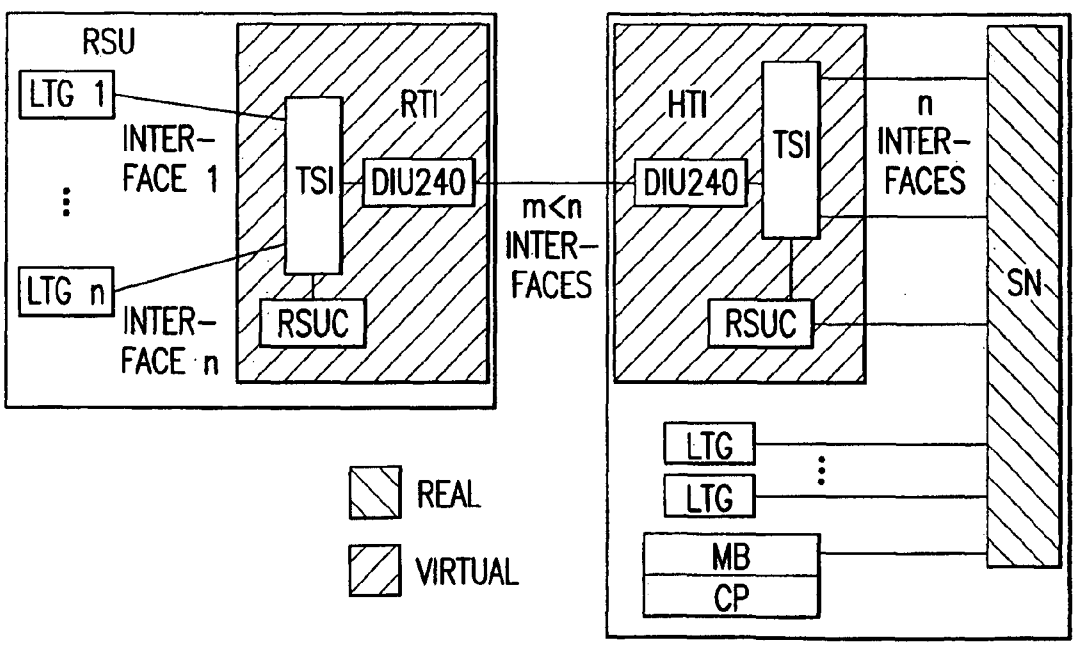
FIG. 3 illustrates the connection of a remote unit to a switching center.

FIG. 3 shows how a remote unit RSU is linked up with a switching center V (parent switching center). According to this figure, it is provided that the peripheral devices LTG connected with the remote unit RSU are split up into a system-internal portion HTI arranged in the parent switching center V, and a portion RTI arranged in the remote unit RSU. Furthermore, units TSI are arranged in the two devices HTI, RTI, which serve as a coupling stage and are each controlled by a controller RSUC. An interface DIU240 is arranged as an interface between the two devices HTI, RTI.

According to the invention, the coupling network is now split up into a real portion and a virtual portion. For this purpose, the numbers of the peripheral devices LTG are distributed in a suitable manner.

In the case of a peripheral device that switches voice channels through or makes hardware available for running virtual peripheral devices, this peripheral device requires access to the coupling network SN and/or message distributor MB. As a result, the number of this peripheral device, i.e., its LTG number, is determined by its connection location with reference to these hardware devices.

In the case of a peripheral device that exists only virtually on real hardware, its LTG number is preferably placed in a region that is not supported, in hardware terms, by the coupling network and the message distributor.

The exchange-side extension of the switching center continues to be based on the subscriber and trunk peripherals, which in part carry their working channel to real peripheral devices of the switching system, or can carry their working data stream outside of the switching center (e.g., H.323 subscribers, SIP subscribers, #7 trunks on a media gateway). The size of the switching center is thereby based on the total number of real and virtual peripheral devices.

The coupling network and the message distributor are administratively set up for this total number of peripheral devices in the database of the switching system. Units that are required for the function of the real peripheral devices are extended in terms of hardware. Portions of the coupling network and the message distributor that are provided exclusively for virtual peripheral devices are not set up or fitted with components. With this measure, the Engineering Rules known to the provider are maintained, and the predominant majority of the interfaces of the administrative and operation technology software portions of the switching center is retained.

Figure 4:
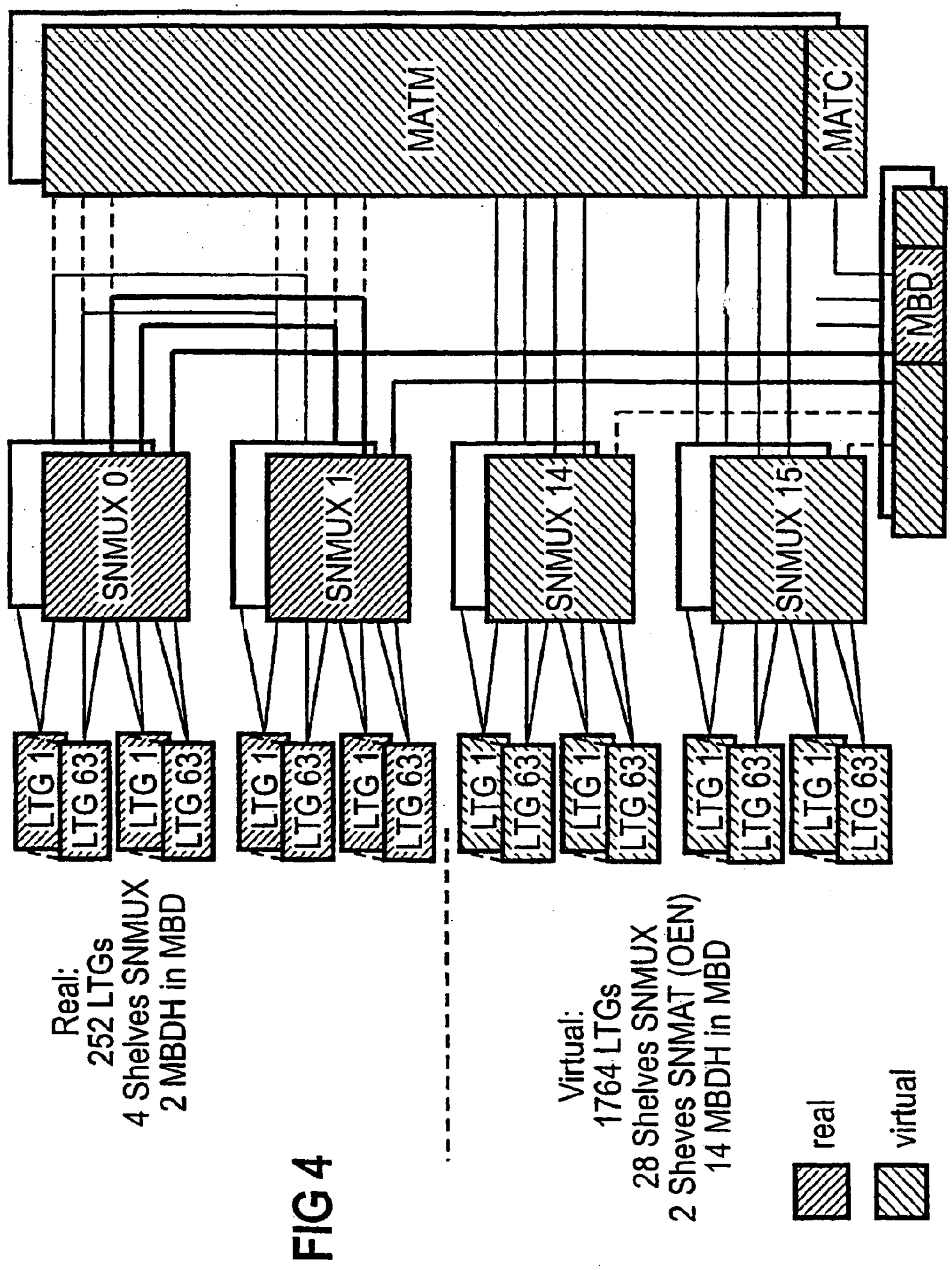
FIG. 4 illustrates virtual portions of the coupling network/message distributor.

As FIG. 4 shows, there are not only real and virtual devices as the visible objects/devices of the switching center, but also real and virtual sub-units of the coupling network (SNMUX, MATM, MATC) and message distributor (MBDH). Here, the real devices are dark-colored and the virtual devices are light-colored. An appropriate identifier is made possible at the user interface, within the scope of setting up the possibly virtual components of the coupling network and the message distributor. Virtual peripheral devices LTG can be connected to real and virtual sub-units SNMUX, while, conversely, only virtual peripheral devices LTG can lie in the field of view of a virtual sub-unit SNMUX. The administrative software assures the appropriate plausibilizations, using the identifier virtual/not virtual that has been introduced at the user interface. For reasons of compatibility with older software versions of the switching center, it is practical if the attribute virtual is an optional parameter of the setup command involved at the user interface.

Virtual portions of the coupling network and the message distributor are never put into operation due to adjustments in the maintenance software of the switching center. Since the virtual portions are units not fitted with components, they do not fail. In the output screens required for the maintenance technician (e.g., hardware status of a unit) they are identified as a virtual unit to allow simple fault clearing of the switching center.

FIG. 4 shows the assignment of virtual peripheral devices LTG to virtual portions of the coupling network SN and the message distributor MBD in detail. A total of 256 virtual peripheral devices LTG are connected with the real sub-units SNMUX 0, SNMUX 1, and a total of 1764 peripheral devices are connected with the virtual sub-units SNMUX 14, SNMUX 15.

Figure 5:
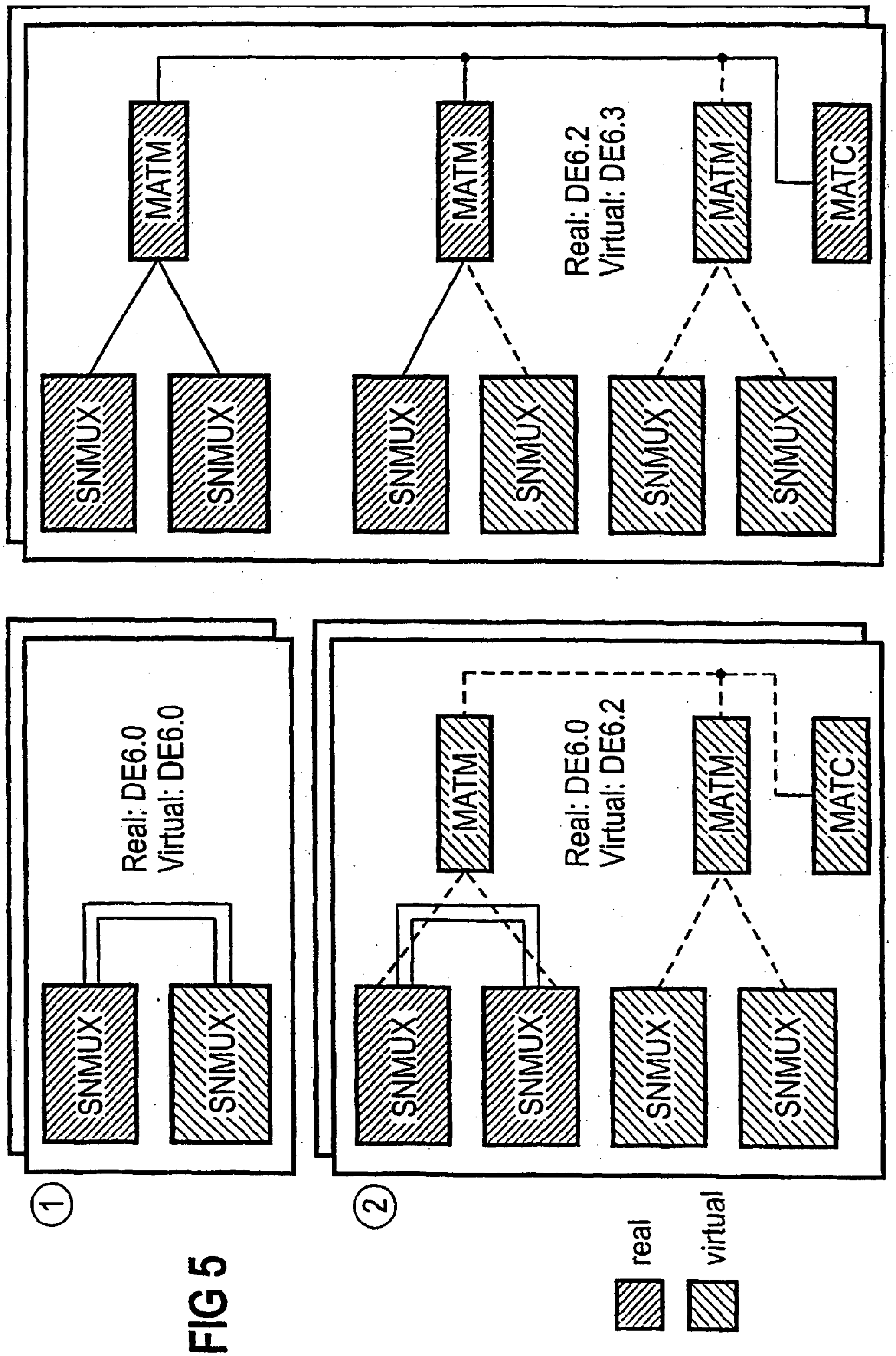
FIG. 5 illustrates different exchange-side extension levels with virtual devices.

FIG. 5 shows the use of virtual portions of the coupling network and the message distributor in three different extension stages. With regard to the virtual sub-units, the coupling network and the message distributor are fitted with fewer components, i.e., not extended in terms of hardware. FIG. 5 shows a device SNMUX in the smallest extension stage 1. In this case, 252 peripheral devices can be connected, half of them being virtual.

In the medium extension stage 2, 504 peripheral devices can be connected, 252 of them being real. In extension stage 3, 756 peripheral devices can be connected (mixed form).

Figure 6:
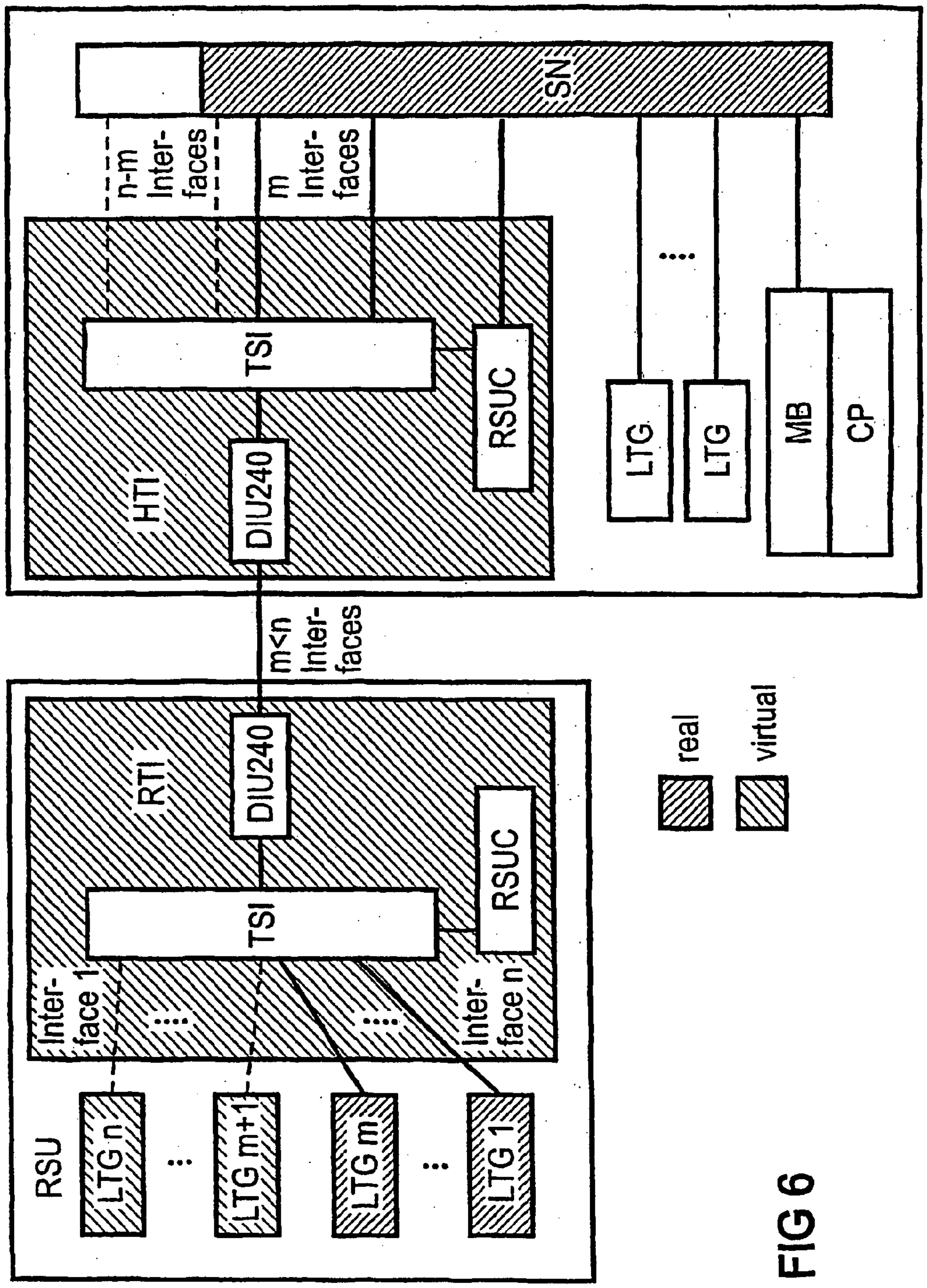
FIG. 6 illustrates an optimized coupling network for virtual peripheral devices at the RSU.

FIG. 6 shows an optimized coupling network for virtual peripheral devices at a remote unit RSU. Here, the virtual portion of the coupling network SN can be seen (light-colored field). The peripheral devices $LTG_1 \ldots LTG_m$ are real, and the peripheral devices $LTG_{M+1} \ldots LTG_N$ are virtual.

What is claimed is:

1. A device for switching through connections carried outside a switching center, comprising:

a plurality of peripheral devices which can be addressed under a common hardware address by a message distribution system of the switching center, each of the peripheral devices having a corresponding logical address, and the peripheral devices being split into real devices corresponding to the hardware address; and virtual peripheral devices, wherein the logical addresses of the peripheral devices that are used exclusively for connection control of connections carried outside the switching center lie in regions of a coupling network that are not extended as hardware, thereby defining a virtual coupling network unit, and thereby splitting the coupling network into real and virtual coupling network units.

2. The device as recited in claim 1, wherein the logical addresses of the peripheral devices that are used exclusively for connection control of connections carried outside the switching center lie in regions of the message distribution system that are not extended as hardware, thereby defining a virtual message distribution system, and thereby splitting the message distribution system into real and virtual message distribution system units.

3. The device as recited in claim 1, wherein extension of a switching center is carried out in accordance with the totality of the virtual and real peripheral devices using a plurality of hardware addresses.

4. The device as recited in claim 1, wherein sub-units of the coupling network and/or the message distribution system that are not extended as a result of their assignment to peripheral devices for connection control of connections carried outside the switching center are set up explicitly as virtual components through a user interface or implicitly kept and indicated as such in the database.

5. The device as recited in claim 1, wherein a virtual attribute is included at the user interface as an optional parameter of an operating command for virtualizable portions of the coupling network and/or message distribution system.

6. The device as recited in claim 5, wherein when setting up virtualizable components of the coupling network and the message distribution system, the virtualizable components can be made plausible against the real and virtual components that have already been set up by the administrative software at the switching center to prevent an incorrect operation.

7. The device as recited in claim 1, wherein during a first startup and a fault clearing of the coupling network and the message distribution system, startup of virtual components of the coupling network and the message distributor is suppressed in operation technology software at the switching center.

8. The device as recited in claim 1, wherein virtual portions of the coupling network and the message distribution system are marked as being virtual in the switching center output that serves for fault clearing, to avoid erroneous fault clearing of non-existent components.

* * * * *